United States Patent Office 2,700,603
Patented Jan. 25, 1955

2,700,603
SELF-HARDENING PYROTECHNIC COMPOSITION

David Hart and Henry J. Eppig, Dover, and William J. Powers, Wharton, N. J.

No Drawing. Application October 13, 1949, Serial No. 121,216

3 Claims. (Cl. 52—24)

(Granted under Title 35, U. S. Code (1952), sec. 266)

The invention described herein may be manufactured and used by or for the Government for governmental purposes without the payment of royalty thereon.

The present invention relates to the incorporation into pyrotechnic mixtures, of plastic materials which are of such a nature that, in addition to acting as binders and regulating the burning rate, they cause the resulting pyrotechnic mixture to become self-hardening at room temperature in the presence or absence of air without appreciable shrinkage.

At present, pyrotechnic compositions used in flares, signals, smokes, tracers and other military pyrotechnics must be pressed into suitable cases at pressures ranging from 2,000 to 110,000 pounds per square inch, in order to obtain smoothness of burning as well as resistance to handling, impact, setback and other similar factors.

We have discovered that one can eliminate the necessity of pressing pyrotechnic compositions by incorporating into the pyrotechnic composition 5 to 40 percent of a liquid plastic such as dichlorstyrene, plastic compositions made from polyesters and crosslinking monomers such as Vibrins, and polyfunctional mercaptans, each together with an appropriate catalyst. After such a liquid plastic with catalyst is incorporated, the pyrotechnic mixture can be hand tamped into the appropriate flare, signal case or tracer body. Such compositions in the presence or absence of air will harden in 24 to 48 hours at room temperature without any appreciable shrinkage, after which they will give smooth burning and luminous efficiencies which are comparable to those obtained from pressed compositions which do not contain these plastics. However, there is a considerable saving in time and labor, since the use of expensive loading presses is eliminated.

We have also discovered that when 10 to 40 percent of the above mentioned type of liquid plastics is added to pyrotechnic mixtures, together with the appropriate catalyst, the resulting mixture may be extruded in the form of candles of any required shape and size. These candles will harden at room temperature in 24 to 48 hours without any appreciable shrinkage and can then be wrapped in a suitable material for use in signals, flares, smokes, tracers, igniters and other military pyrotechnics.

As examples, the following compositions have been successful in producing self-hardening pyrotechnic compositions at room temperature which can be hand tamped or extruded and which will give smooth burning and luminous efficiencies comparable to those obtained from pressed compositions which do not contain these binders.

Table I.—Polyfunctional mercaptans

|  | 1 | 2 | 3 | 4 | 5 | 6 | 7 | 8 |
|---|---|---|---|---|---|---|---|---|
| Sodium nitrate | 35 | 35 | 40 | 40 | 60 | 60 | 35 | 60 |
| Magnesium | 65 | 65 | 60 | 60 | 40 | 40 | 65 | 40 |
| Polyfunctional Mercaptan (Thiokol) | 10 | 20 | 15 | 10 | 20 | 10 | 10 | 20 |
| Cumene Hydroperoxide (Catalyst) | 1 | 2 | 1.5 | 1 | 2 | 1 |  |  |
| Lead Peroxide (Catalyst) |  |  |  |  |  |  | 1 | 2 |

Table II.—Polyesters (Vibrins)

|  | 1 | 2 | 3 | 4 |
|---|---|---|---|---|
| Barium nitrate | 35 | 65 | 50 | 25 |
| Magnesium | 65 | 35 | 50 | 75 |
| Polyester | 10 | 20 | 30 | 40 |
| Benzoyl Peroxide (Catalyst) | 0.05 | 0.4 | 0.6 | 0.8 |

Table III.—Dichlorstyrene

|  | 1 | 2 | 3 | 4 |
|---|---|---|---|---|
| Strontium nitrate | 35 | 65 | 50 | 25 |
| Magnesium | 65 | 35 | 50 | 75 |
| Dichlorstyrene (monomeric+polymeric) | 10 | 20 | 30 | 40 |
| Benzoyl Peroxide } Catalyst | 0.5 | 1.0 | 1.5 | 2.0 |
| Stannic chloride | | | | |

The above particular exemplifications are cited merely as illustrative examples and are not to be understood as limiting the scope of the invention.

Having thus described the invention what is claimed as new is:

1. A pyrotechnic composition consisting of sodium nitrate, magnesium, and from 5 to 40 percent of a liquid plastic of the group consisting of polyfunctional mercaptans, polyesters and dichlorostyrene and an appropriate catalyst chosen from the group consisting of peroxides and tin compounds which can be extruded and will then self-harden in 24 to 48 hours at room temperature without any appreciable shrinkage.

2. A pyrotechnic composition consisting of sodium nitrate, magnesium, from 5 to 40 per cent of a polyfunctional mercaptan and an appropriate catalyst selected from the group consisting of peroxides and tin compounds.

3. A composition of matter consisting of a pyrotechnic mixture which consists of magnesium and a nitrate chosen from a group consisting of sodium, barium and strontium nitrates, and as a binder 5 to 40 percent of a liquid plastic of the group consisting of polyfunctional mercaptans, polyesters and dichlorostyrene and an appropriate catalyst selected from the group consisting of peroxides and tin compounds.

References Cited in the file of this patent

UNITED STATES PATENTS

| 2,416,639 | Pearsall | Feb. 25, 1947 |
| 2,433,417 | Bitting et al. | Dec. 30, 1947 |
| 2,467,527 | Harris | Apr. 19, 1949 |

FOREIGN PATENTS

| 580,409 | Great Britain | Sept. 6, 1946 |

OTHER REFERENCES

Weeks: "Casting Techniques for Polyesters," Modern Plastics, August 1948, pages 103–110. Copy in Scientific Library.